United States Patent [19]

Wosnitza et al.

[11] Patent Number: 5,344,621
[45] Date of Patent: Sep. 6, 1994

[54] AUTOCLAVE FOR TREATING CHARGED MATERIALS

[75] Inventors: Franz Wosnitza, Aachen, Fed. Rep. of Germany; George Beckmann, Vienna, Austria; Georg Zimmermann, Aachen, Fed. Rep. of Germany

[73] Assignees: Hebel Aktiengesellschaft, Emmering; Sicowa Verfahrenstechnik Fuer Baustoffe GmbH & Co. KG, Aachen, both of Fed. Rep. of Germany

[21] Appl. No.: 963,984

[22] Filed: Oct. 20, 1992

[30] Foreign Application Priority Data

Oct. 24, 1991 [DE] Fed. Rep. of Germany ....... 4135118

[51] Int. Cl.⁵ ............. A61L 2/20; A61L 2/00
[52] U.S. Cl. ............... 422/298; 422/295; 422/302; 422/307
[58] Field of Search ............ 422/295, 298, 302, 307

[56] References Cited

U.S. PATENT DOCUMENTS

| | | | |
|---|---|---|---|
| 583,514 | 6/1897 | Sprague | 422/295 |
| 1,015,847 | 1/1912 | Shields | 422/295 X |
| 2,668,224 | 2/1954 | Spradling et al. | 422/295 X |
| 3,065,509 | 11/1962 | Vischer, Jr. | 422/295 |
| 3,093,449 | 6/1963 | Katarski et al. | 422/295 X |
| 3,361,517 | 1/1968 | Skaller | 422/298 X |
| 3,511,169 | 5/1970 | Fritzberg et al. | 422/295 X |
| 3,627,477 | 12/1971 | Baeuvais | 422/295 X |
| 3,632,303 | 1/1972 | Aigner | 422/295 |
| 3,717,434 | 2/1973 | Black | 422/298 X |
| 3,980,131 | 9/1976 | Perle et al. | 422/295 X |
| 4,111,645 | 9/1978 | Fahlvik et al. | 422/295 X |
| 4,127,384 | 11/1978 | Fahlvik et al. | 422/295 X |
| 4,192,845 | 3/1980 | Kacasek | 422/302 X |
| 4,560,346 | 12/1985 | Schulz | 432/24 |
| 4,948,566 | 8/1990 | Gabele et al. | 422/295 X |
| 4,974,663 | 12/1990 | Nakaji | 422/295 X |

FOREIGN PATENT DOCUMENTS 0133239 2/1985 European Pat. Off. .
0333389 10/1989 European Pat. Off. .
227794 10/1943 Switzerland .

OTHER PUBLICATIONS

*Derwent World Patent Index printout for EP-0-13-3-239 (2 pp.).
Copy of Official Gazette Abstract for U.S. Pat. No. 4,560,346 (1 page).

Primary Examiner—James C. Housel
Assistant Examiner—Milton I. Cano
Attorney, Agent, or Firm—Flynn, Thiel, Boutell & Tanis

[57] ABSTRACT

An autoclave for treating charged materials (6) with vapor under pressure, with a substantially cylindrical inner chamber (2) surrounded by an autoclave casing (1) and with a heating device (8) responsive to a heated heat transfer medium to generate vapor in the inner chamber (2). In order to provide the heating in a way which is favorable structurally and in terms of energy, it is provided that the heating device (8) is arranged within one of the curved side regions of the autoclave casing (1), and consists of at least one flue (10) arranged substantially vertically in the autoclave and a heat exchanger (11) arranged in the lower inflow region of the flue (10) and through which flows a heat transfer medium, so that a convection flow results circulating substantially in the circumferential direction of the casing (1) of the autoclave.

4 Claims, 1 Drawing Sheet

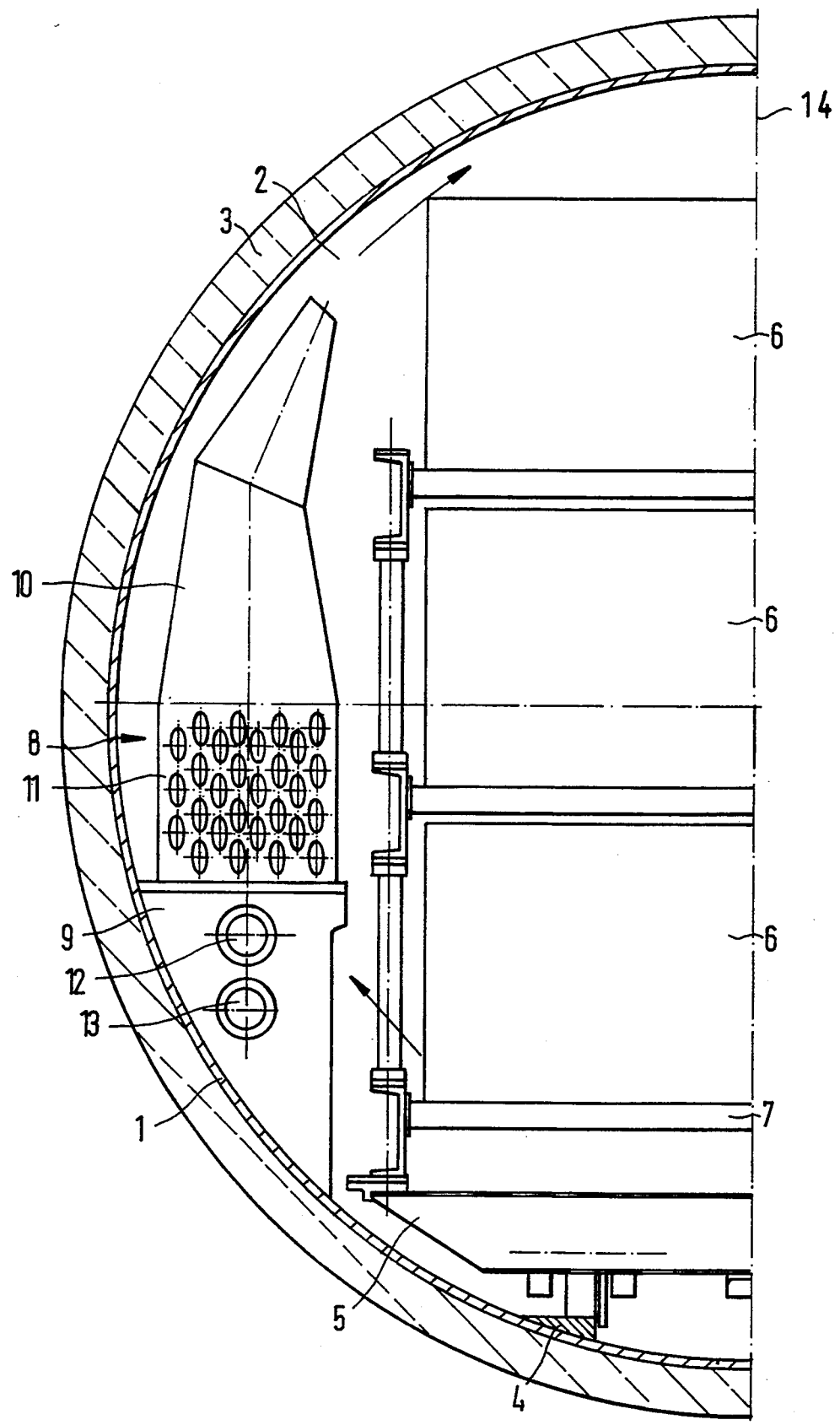

AUTOCLAVE FOR TREATING CHARGED MATERIALS

FIELD OF THE INVENTION

This invention relates to an autoclave for treating charged materials with vapour under pressure, with a substantially cylindrical inner chamber surrounded by an autoclave casing and with a heating device responsive to a heated heat transfer medium to generate vapour in the inner chamber.

BACKGROUND OF THE INVENTION

Such an autoclave is known from EP-B 0 133 239, in which the autoclave casing is made double-wailed in order either that a heated heat carrying material such as hot oil can flow through directly or that it can receive heating coils, through which the heat transfer medium flows. Such autoclave heating is costly in terms of structure and energy, as well as slow.

The object of the invention is to provide an autoclave of the kind initially recited, whose heating is simplified structurally, which is favourable in terms of energy and is easy to control.

SUMMARY OF THE INVENTION

The object is attained according to the invention in that the heating device is arranged within one of the curved side regions of the autoclave casing, and consists of at least one flue arranged substantially vertically in the autoclave and a heat exchanger arranged in the lower inflow region of the flue and through which flows a heat transfer medium, so that a convection flow results circulating substantially in the circumferential direction of the casing of the autoclave.

Further developments of the invention will be found in the ensuing description and the dependent claims.

BRIEF DESCRIPTION OF THE DRAWING

The single drawing illustrates a partial section view of the autoclave along an axis perpendicular to a longitudinal axis of the autoclave casing.

DETAILED DESCRIPTION

The invention will now be explained in more detail with reference to an autoclave shown in the single drawing.

The illustrated autoclave comprises an autoclave casing wall 1, which defines a substantially cylindrical inner chamber 2, having a vertical center plane 14 extending therethrough a charging opening which is closed by a cover and has heat insulation 3 outside, in order to keep heat losses as small as possible is provided at one end or both ends.

In the illustrated embodiment of the autoclave, rails 4 are fitted in the autoclave casing wall 1 at the bottom, in order to be able to charge the autoclave with trolleys 5, which carry charged materials 6, e.g. moulded bodies of materials containing hardeners to be hardened by vapour, on pallets 7, which are stacked on the trolley 5.

In one of the curved regions at the side of the autoclave casing wall 1, which are in any event not occupied by the charged materials, there is arranged a heating device 8, which is mounted on a bracket 9. The heating device 8 consists of at least one flue 10 arranged substantially vertically and which preferably extends over at least half the height of the autoclave casing 1 and is roughly matched to the curvature of the latter, and a heat exchanger 11, which is arranged in the lower, inflow region of the flue 10 and is connected to a flow line 12 and a return line 13 for heating oil, which can be heated outside the autoclave by means of a heating oil heater. Accordingly, as a result of the free convection in operation of the heat exchanger 11 through the flue 10 there is generated a circulating flow in the circumferential direction of the autoclave casing 1, wherewith the saturated vapour or superheated vapour for heating the charged materials 6 and an increase in pressure can be created.

The upper outlet opening of the flue 10 is preferably tapered like a nozzle.

If the heating device 8 consists of a plurality of flues 10 with heat exchangers 11 arranged therein, these can be arranged spaced from one another, but preferably on the same side of the autoclave.

Such a heating device 8 is constructionally simple, provides the heat directly and thus in an energetically favourable way in the autoclave, and the inertia is small, since a change in the temperature of the heating oil acts directly in the autoclave and not only through the strong autoclave wall 1 adapted to absorb the internal pressure.

We claim:

1. In an autoclave for treating charged materials with vapor under pressure, the autoclave having an elongated and hollow substantially cylindrical casing wall oriented along a horizontally aligned axis and defining an inner chamber for receiving said charged materials therein the inner chamber including a curved side region oriented laterally on each side of a vertical center plane thereof and a heating device disposed within the inner chamber, the heating device being connected to a source of heated heat transfer medium to generate the vapor in the inner chamber, and being arranged within at least one of the curved side regions of the inner chamber, the improvement wherein the heating device includes as a sole means for heating at least one flue having a longitudinal axis extending substantially parallel to the vertical center plane and oriented within the at least one of the curved side regions of the inner chamber, a lower portion of the at least one of the curved side regions defining a lower inflow region of said at least one flue, the heating device further including a heat exchanger arranged within the inner chamber in said lower inflow region of said at least one flue through which heat exchanger flows the heated heat transfer medium so that a free convection flow of the vapor through said at least one flue results, the vapor circulating upwards within said at least one flue substantially in a circumferential direction of the casing wall and then circulating downwards within the inner chamber without means for forcing vapor flow within said inner chamber.

2. The autoclave according to claim 1, wherein said at least one flue substantially conforms to a curvature of said cylindrical casing wall.

3. The autoclave according to claim 1, wherein said at least one flue and said heat exchanger are fitted on a bracket attached to said cylindrical casing wall.

4. The autoclave according to claim 1, wherein said at least one flue is tapered ending in a nozzle-shaped outlet end.

* * * * *

UNITED STATES PATENT AND TRADEMARK OFFICE
CERTIFICATE OF CORRECTION

PATENT NO. : 5 344 621
DATED : September 6, 1994
INVENTOR(S) : Dr. Ing. Franz WOSNITZA, et al.

It is certified that error appears in the above-indentified patent and that said Letters Patent is hereby corrected as shown below:   On the title page:

[75] Inventors: change "George Beckmann" to
---Georg Beckmann---.

Column 2, line 28; after "with" insert
---saturated or superheated---.
line 33; after "therein" insert ---,---.
line 37; after "the" insert
---saturated or superheated---.

Signed and Sealed this

Twenty-third Day of July, 1996

Attest:

BRUCE LEHMAN

Attesting Officer      Commissioner of Patents and Trademarks